United States Patent
Arntz et al.

(10) Patent No.: US 10,889,679 B2
(45) Date of Patent: Jan. 12, 2021

(54) POLYURETHANE HYBRID POLYMERS AND PROCESS FOR THE PRODUCTION THEREOF

(71) Applicant: Covestro Deutschland AG, Leverkusen (DE)

(72) Inventors: Hans-Detlef Arntz, Overath (DE); Koichi Kawamura, Fujieda (JP); Gerlinde Koss-Nasser, Leverkusen (DE); Erhard Michels, Cologne (DE)

(73) Assignee: Covestro Deutschland AG, Leverkusen (DE)

( * ) Notice: Subject to any disclaimer, the term of this patent is extended or adjusted under 35 U.S.C. 154(b) by 0 days.

(21) Appl. No.: 16/764,999

(22) PCT Filed: Dec. 14, 2018

(86) PCT No.: PCT/EP2018/084866
§ 371 (c)(1),
(2) Date: May 18, 2020

(87) PCT Pub. No.: WO2019/121355
PCT Pub. Date: Jun. 27, 2019

(65) Prior Publication Data
US 2020/0308333 A1    Oct. 1, 2020

(30) Foreign Application Priority Data
Dec. 21, 2017 (EP) ..................................... 17209216

(51) Int. Cl.
| | | |
|---|---|---|
| *C08G 18/10* | (2006.01) | |
| *C08G 18/20* | (2006.01) | |
| *C08G 18/48* | (2006.01) | |
| *C08G 18/62* | (2006.01) | |
| *C08G 18/76* | (2006.01) | |
| C08G 18/79 | (2006.01) | |

(52) U.S. Cl.
CPC ......... *C08G 18/10* (2013.01); *C08G 18/2063* (2013.01); *C08G 18/4837* (2013.01); *C08G 18/6204* (2013.01); *C08G 18/6262* (2013.01); *C08G 18/7664* (2013.01); *C08F 2438/03* (2013.01); *C08G 18/7671* (2013.01); *C08G 18/798* (2013.01)

(58) Field of Classification Search
CPC ............... C08G 18/10; C08G 18/2063; C08G 18/4837; C08G 18/6204; C08G 18/7664; C08G 18/7671; C08G 18/798; C08G 18/62; C08G 18/2027; C08F 2438/03
See application file for complete search history.

(56) References Cited

U.S. PATENT DOCUMENTS

| | | | |
|---|---|---|---|
| 4,581,387 A | | 4/1986 | Werner et al. |
| 4,764,537 A | | 8/1988 | Horn et al. |
| 5,391,665 A | * | 2/1995 | Matsunaga ............... C08F 2/38 526/211 |
| 7,687,599 B2 | | 3/2010 | Lorenz et al. |
| 7,893,189 B2 | | 2/2011 | Lorenz et al. |
| 2008/0071056 A1 | * | 3/2008 | Borst ................. C08G 18/4072 528/44 |
| 2008/0113185 A1 | * | 5/2008 | Haas ................... C08G 18/4841 428/332 |
| 2019/0185666 A1 | * | 6/2019 | Adkins ............. C08G 18/4837 |

FOREIGN PATENT DOCUMENTS

| | | |
|---|---|---|
| DE | 3607447 A1 | 9/1987 |
| EP | 0786480 A1 | 7/1997 |

OTHER PUBLICATIONS

International Search Report, PCT/EP2018/084866, dated Mar. 21, 2019, Authorized officer: Martin Sütterlin.
Journal of Polymer Science, Part A, Polymer Chemistry 2013, vol. 51, pp. 318-326.
Journal of Applied Polymer Science, vol. 70, pp. 613-627 (1998).
Polymer 46 (2005), pp. 11 294-11 300.
Macromolecules (2015), vol. 45, p. 4958.

* cited by examiner

*Primary Examiner* — Michael L Leonard
(74) *Attorney, Agent, or Firm* — Donald R. Palladino; Jed C. Benson

(57) ABSTRACT

The present invention relates to polyurethane hybrid polymers and to a process for producing same.

2 Claims, No Drawings

POLYURETHANE HYBRID POLYMERS AND PROCESS FOR THE PRODUCTION THEREOF

CROSS-REFERENCE TO RELATED APPLICATION

This application is a national stage application under 35 U.S.C. § 371 of PCT/EP2018/084866, filed Dec. 14, 2018, which claims the benefit of European Application No. 17209216, filed Dec. 21, 2017, each of which is incorporated herein by reference.

FIELD

The present invention relates to polyurethane hybrid polymers and to a method for the preparation thereof.

BACKGROUND

An important property for polymer materials is the water absorption of the material used. The water absorption of polyurethanes is strongly influenced by the polyols used, for example ethylene oxide-rich polyether polyols have a higher tendency to absorb water than propylene oxide-rich polyether polyols. The absorption of water leads to softening of materials, to swelling and to susceptibility to mechanical damage. Although the use of polyester polyols can reduce water absorption, such products are susceptible to hydrolysis-induced polymer degradation.

A useful way of reducing water absorption is to use semicrystalline hydrocarbon compounds that are able to react with isocyanates via OH, NH, or SH groups, thereby providing access to a polyurethane hybrid material. Examples of such compounds are known from the literature. These are polyacrylates and/or polystyrenes that contain suitable groups that are reactive toward isocyanate.

Journal of Polymer Science, Part A, Polymer Chemistry 2013, vol. 51, pages 318-326 describes the preparation of polystyrene diols that are converted into a polyurethane, for example by reaction with a diisocyanate using chlorobenzene as solvent. After removal of the solvent and after drying, a polyurethane precipitate is obtained. The solvent is required in order for the reaction to the polyurethane to take place.

Journal of Applied Polymer Science, vol. 70, pages 613-627 (1998) describes the preparation of poly(urethane-block-methyl methacrylate) and poly(urethane-block-styrene) copolymers in butanone as solvent using polyurethane macroazo initiators (PUMAIs). In a first step, these polyurethane macroazo initiators (PUMAIs) are prepared from methylene diphenyl diisocyanate (MDI) and azobis(2-cyanopropanol) (ACP) in butanone. The resulting NCO-terminated radical initiator in butanone is converted into a PUMAI with hydroxypolycaprolactone (PCL). These PUMAIs then undergo reaction in a block copolymerization, for example with styrene. The yield is only low. These block copolymers thus produced are compared with polyurethane-polystyrene blends.

Polymer 46 (2005), pages 11 294-11 300 describes polyurethane-polystyrene copolymers prepared from a 2-hydroxyethyl acrylate-terminated isophorone diisocyanate-polytetramethylene glycol NCO prepolymer by RAFT (reversible addition-fragmentation chain-transfer) polymerization with styrene using 4-((benzodithioyl)methyl)benzoic acid as RAFT agent. The styrene component is polymerized onto the polyurethane already present. The resulting copolymer films show low water absorption (15-18%). However, compared to pure polyurethane films, the polyurethane-polystyrene copolymer films show appreciably increased hardness and tensile strength overall, while having a greatly reduced elongation at break.

SUMMARY

The object of the present invention was to provide polyurethanes having low water absorption that can at the same time be prepared in a straightforward manner and without using solvents and with which rapid phase stability of the mixture of starting components is achieved.

The abovementioned object was surprisingly achieved by incorporating polystyrene and/or polyacrylonitrile into the polyurethane structure, specifically by using polystyrene polyols and/or polyacrylonitrile polyols as the starting compound, even though polystyrene polyol compounds having number-average molecular weights of >1000 g/mol and polyacrylonitrile compounds having number-average molecular weights of >3000 g/mol are usually solids, which severely limits the immediate processability thereof in standard processing technology for the production of polyurethanes. For this reason, polystyrene polyols and polyacrylonitrile polyols have hitherto been used only in solvents.

The method of the invention is in particular characterized in that NCO prepolymers are prepared from polystyrene polyols and/or polyacrylonitrile polyols with polyisocyanates, and are processed to polyurethane hybrid polymers in a further step.

DETAILED DESCRIPTION

The invention relates to polyurethane hybrid polymers prepared from polyisocyanates (A) and compounds (B) bearing isocyanate-reactive groups in a molar ratio of NCO groups to OH and/or NH groups of 0.8:1 to 3.5:1 through the reaction of a) at least one NCO prepolymer as polyisocyanate (A),
b) at least one compound (B) bearing isocyanate-reactive groups from the group consisting of polyester polyols, polyether polyols, polyetherester polyols and amino-terminated polyethers, and
c) optionally chain extenders and/or crosslinkers (C)
in the presence of
d) optionally catalysts (D)
e) optionally auxiliaries and/or additives (E),
wherein the NCO prepolymer has an NCO content of 10% to 40% by weight and is prepared from at least one polyisocyanate (A') from the group consisting of aliphatic and aromatic polyisocyanates and at least one polyol component (B) from the group consisting of polystyrene polyol having a number-average molecular weight of >1000 g/mol, preferably >1500 g/mol, more preferably 2000 g/mol, and polyacrylonitrile polyol having a number-average molecular weight of >2000 g/mol, preferably >3000 g/mol, and optionally at least one further polyol (B") from the group consisting of polyester polyols, polyether polyols, and polyetherester polyols.

The invention further relates to a method for preparing polyurethane hybrid polymers, wherein polyisocyanates (A) are reacted with compounds (B) bearing isocyanate-reactive groups and optionally with chain extenders and/or crosslinkers (C) in the presence optionally of catalysts (D) and optionally of auxiliaries and/or additives (E) in a molar ratio of NCO groups to OH and/or NH groups of 0.8:1 to 3.5:1, characterized in that i) the polyisocyanate (A) used is an NCO prepolymer having an NCO content of 10% to 40% by weight, which is prepared from at least one polyisocyanate (A') from the group consisting of aliphatic and aromatic polyisocyanates and at least one polyol component (B') from the group consisting of polystyrene polyol having a number-average molecular weight of >1000 g/mol, preferably >1500 g/mol, more preferably 2000 g/mol, and polyacrylonitrile polyol having a number-average molecular weight of >2000 g/mol, preferably >3000 g/mol, and optionally at least one further polyol (B") from the group consisting of polyester polyols, polyether polyols, and polyetherester polyols, and ii) the compound (B) bearing isocyanate-reactive groups that is used is at least one compound from the group consisting of polyester polyols, polyether polyols, polyetherester polyols, and amino-terminated polyethers.

The method of the invention allows the direct incorporation of polystyrene units and/or polyacrylonitrile units into polyurethanes.

The polystyrene polyols and polyacrylonitrile polyols used are compounds of the formula below and prepared as shown below:

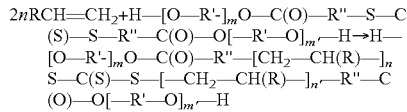

2nRCH=CH$_2$+H—[O—R'—]$_m$O—C(O)—R"—S—C(S)—S—R"—C(O)—O[—R'—O]$_{m'}$—H→H—[O—R'—]$_m$O—C(O)—R"—[CH$_2$—CH(R)—]$_n$S—C(S)—S—[—CH$_2$—CH(R)—]$_{n'}$—R"—C(O)—O[—R'—O]$_{m'}$—H

R here stands for an aromatic radical C$_6$H$_5$ or for a nitrile radical CN. Indices n, n', m, and m' are each an integer≥1. R' and R" are alkylene radicals.

The compound (B) that is reactive toward isocyanate groups, with which the isocyanate-terminated prepolymers can be processed, may be any compound that can be used for the preparation of polyurethanes and that has at least two isocyanate-reactive groups containing hydrogen atoms. As compounds reactive toward isocyanate groups, preference is given to using polyether polyols, polyester polyols, polyetherester polyols, and amino-terminated polyethers or mixtures thereof. Particular preference is given to polyether polyols.

As component (B"), preference is given to using polyether polyols, polyester polyols, and polyetherester polyols or mixtures thereof.

Suitable polyether polyols may be prepared from one or more alkylene oxides having 2 to 4 carbon atoms in the alkylene radical by known methods, for example by anionic polymerization catalyzed by alkali metal hydroxides such as sodium hydroxide or potassium hydroxide or by alkali metal alkoxides such as sodium methoxide, sodium ethoxide, potassium ethoxide or potassium isopropoxide and with the addition of at least one starter molecule containing 2 to 8 reactive hydrogen atoms, or by cationic polymerization catalyzed by Lewis acids such as antimony pentachloride and boron fluoride etherate or by fuller's earth. Multimetal cyanide compounds, so-called DMC catalysts, may also be used as catalysts. Examples of suitable alkylene oxides are tetrahydrofuran, 1,3-propylene oxide, 1,2- and 2,3-butylene oxide, styrene oxide, and preferably ethylene oxide and 1,2-propylene oxide. The alkylene oxides can be used individually, alternately in succession or as mixtures.

Examples of suitable starter molecules include: water, organic dicarboxylic acids such as succinic acid, adipic acid, phthalic acid and terephthalic acid, aliphatic and aromatic, optionally N-mono-, N,N- and N,N'-dialkyl-substituted diamines having 1 to 4 carbon atoms in the alkyl radical, such as optionally mono- and dialkyl-substituted ethylenediamine, diethylenetriamine, triethylenetetramine, 1,3-propylenediamine, 1,3- and 1,4-butylenediamine, 1,2-, 1,3-, 1,4-, 1,5-, and 1,6-hexamethylenediamine, phenylenediamines, 2,3-, 2,4-, and 2,6-tolylenediamine and 4,4'-, 2,4'-, and 2,2'-diaminodiphenylmethane.

Other suitable starter molecules are alkanolamines, such as ethanolamine, diethanolamine, N-methyl- and N-ethylethanolamine, N-methyl- and N-ethyldiethanolamine, and triethanolamine, and ammonia. Preference is given to using polyhydric, in particular dihydric to octahydric, alcohols such as ethanediol, 1,2- and 1,3-propanediol, diethylene glycol, dipropylene glycol, 1,4-butanediol, 1,6-hexanediol, glycerol, trimethylolpropane, pentaerythritol, glucose, fructose, and sucrose.

The polyether polyols, preferably polyoxyethylene polyols, polyoxypropylene polyols, and polyoxypropylene-polyoxyethylene polyols, have a number-average functionality of 1.5 to 5.0, preferably of 1.8 to 4.2, and in particular of 2.0 to 3.5, and number-average molecular weights of preferably 32 to 1500, more preferably 60 to 1000, and in particular 60 to 800.

The different functionalities are obtained preferably by using different starters.

The polyester polyols that may be used according to the invention have predominantly hydroxyl end groups. By contrast, they have only a very minor content of carboxylate end groups.

Suitable polyester polyols may have molecular masses in the range from 250 Da to 10 000 Da, preferably from 300 Da to 6000 Da. The number of hydroxyl end groups in the polyester polyol may be 2 to 6. The mean functionality of the polyester polyols is preferably >2 to <3.

Low-molecular-weight polyols that can be used for the preparation of the polyester polyols are preferably those having hydroxyl functionalities of 2 to 6. In preferred embodiments they have between 2 and 36, more preferably between 2 and 12, carbon atoms. Preferably at least 90 mol %, more preferably 100 mol %, of all the alcohol groups in the alcohol component from which the polyester is formed originate from unbranched α,ω-diols (based on a total content of alcohol groups in the alcohol component from which the polyester is formed of 100 mol %)).

Very particular preference is given to using polyols from the group:
ethylene glycol and diethylene glycol and higher homologs thereof, 1,3-propanediol, 1,4-butanediol, 1,5-pentanediol, 1,6-hexanediol, 1,7-heptanediol, 1,8-octanediol, 1,9-nonanediol, 1,10-decanediol, 1,11-undecanediol, 1,12-dodecanediol, and higher homologs thereof.

Mixtures of these polyols with one another or with other polyols may of course also be used; in the latter case the recited polyols preferably contribute at least 90 mol % of all hydroxyl groups.

The additional use of polyols from the following group is possible in principle, although not preferable: 1,2-propanediol, dipropylene glycol and higher homologs thereof, 2-methylpropane-1,3-diol, neopentyl glycol, 3-methylpentane-1,5-diol, glycerol, pentaerythritol, 1,1,1-trimethylolpropane, and carbohydrates having 5 to 12 carbon atoms (for example isosorbide). These may likewise be mixed with one another or with other polyols. However, if such polyols are used, the unbranched α,ω-diols identified above as being very particularly preferred must contribute at least 90 mol % of all hydroxyl groups.

Low-molecular-weight polycarboxylic acid equivalents that can be used for the preparation of the polyester polyols have in particular 2 to 36, preferably 2 to 12, carbon atoms. The low-molecular-weight polycarboxylic acid equivalents may be aliphatic or aromatic. They are preferably selected from the group:
succinic acid, fumaric acid, maleic acid, maleic anhydride, glutaric acid, adipic acid, sebacic acid, suberic acid, azelaic acid, 1,10-decanedicarboxylic acid, 1,12-dodecanedicarboxylic acid, phthalic acid, phthalic anhydride, isophthalic acid, terephthalic acid, pyromellitic acid, and trimellitic acid.

Mixtures of these low-molecular-weight polycarboxylic acid equivalents with one another or with other polycarboxylic acid equivalents may of course also be used; in the latter case the recited polycarboxylic acid equivalents preferably contribute at least 90 mol % of all carboxyl groups.

If hydroxycarboxylic acids including their internal anhydrides (lactones) are used in full or in part, preference is given to using caprolactone and/or 6-hydroxycaproic acid.

The compounds described in EP1702941A1 may be used as polyetherester polyols.

Examples of amino-terminated polyether polyols that may be used are the so-called Jeffamines® from Huntsman, for example D-230, D-400, D-2000, T-403, T-3000, T-5000, or corresponding products from BASF, for example polyetheramines D230, D400, D200, T403, T5000, or polytetrahydrofuranamines (BASF product: polytetrahydrofuranamine 1 700).

Substances that have at least two groups reactive toward isocyanates are used as chain extenders and/or crosslinkers (C), with the substances having at least one free SH, OH or NH group. Specific examples include the following compounds: ethylenediamine, 1,2-propanediol, 1,3-propanediol, glycerol, 2,3-butanediol, 1,3-butanediol, 1,4-butanediol, 2-methylpropane-1,3-diol, 1,2-pentanediol, 1,3-pentanediol, 1,4-pentanediol, 1,5-pentanediol, 2,2-dimethylpropane-1,3-diol, 2-methylbutane-1,4-diol, 2-methylbutane-1,3-diol, monoethylene glycol, 1,1,1-trimethylolethane, 3-methyl-1,5-pentanediol, 1,1,1-trimethylolpropane, 1,6-hexanediol, 1,7-heptanediol, 2-ethylhexane-1,6-diol, 1,8-octanediol, 1,9-nonanediol, 1,10-decanediol, 1,11-undecanediol, 1,12-dodecanediol, diethylene glycol, triethylene glycol, 1,4-cyclohexanediol, 1,3-cyclohexanediol, tolylenediamines or derivatives thereof, such as 3,5-diethyltolylene-2,4-diamine, triethylene glycol diamine, and water. In this preferred embodiment, the molecular weight of the chain extender is preferably between 100 and 400 g/mol, more preferably between 100 and 200 g/mol, and in particular between 100 and 150 g/mol.

The polyisocyanates (A') used for the preparation of the prepolymers, if undergoing subsequent reaction with polystyrene polyols, are preferably aromatic polyisocyanates. Preference is given to using aromatic polyisocyanates of the general formula $R(NCO)_z$, where R is a polyvalent organic radical having an aromatic ring unit and z is an integer of at least 2. Examples of these are:
4,4'-diisocyanatobenzene, 1,3-diisocyanato-o-xylene, 1,3-diisocyanato-p-xylene, 1,3-diisocyanato-m-xylene, 2,4-diisocyanato-1-chlorobenzene, 2,4-diisocyanato-1-nitrobenzene, 2,5-diisocyanato-1-nitrobenzene, m-phenylene diisocyanate, p-phenylene diisocyanate, toluene 2,4-diisocyanate, toluene 2,6-diisocyanate, mixtures of toluene 2,4-diisocyanate and 2,6-diisocyanate, naphthalene 1,5-diisocyanate, 1-methoxyphenylene 2,4-diisocyanate, diphenylmethane 4,4'-diisocyanate, diphenylmethane 2,4'-diisocyanate, diphenylmethane 2,2'-diisocyanate, biphenylene 4,4'-diisocyanate, 3,3'-dimethyldiphenylmethane 4,4'-diisocyanate, naphthalene 1,5-diisocyanate, and 3,3'-dimethyldiphenylmethane 4,4'-diisocyanate; triisocyanates such as triphenylmethane 4,4',4''-triisocyanate and toluene 2,4,6-triisocyanate, and tetraisocyanates such as 4,4'-dimethyldiphenylmethane 2,2'-5,5'-tetraisocyanate.

Particular preference is given to toluene diisocyanates, diphenylmethane 2,4'-diisocyanate, diphenylmethane 4,4'-diisocyanate, polymethylene polyphenylene polyisocyanate, and derivatives such as, for example, modified compounds of these isocyanates in the form of carbodiimides, uretonimines and/or isocyanurates and mixtures thereof.

On the other hand, if undergoing subsequent reaction with polyacrylonitrile polyols, the prepolymers are preferably prepared from the aliphatic, cycloaliphatic and/or araliphatic polyisocyanates known per se and mixtures thereof. Examples of these include hexamethylene 1,6-diisocyanate, isophorone diisocyanate, pentamethylene diisocyanate, xylylene diisocyanate, cyclohexane 1,4-diisocyanate (CHDI), methyldicyclohexyl diisocyanate (H12-MDI), and modified compounds of these isocyanates in the form of allophanates, biurets, and carbodiimides, and also isocyanate dimers and trimers (U. Meier-Westhues, Polyurethanes—Coatings, Adhesives and Sealants, Hannover: Vincentz Network, 2007 (European Coatings Tech Files) ISBN 3-87870-334-1).

Particular preference is given to hexamethylene 1,6-diisocyanate, isophorone diisocyanate, and methyldicyclohexyl diisocyanate.

Suitable polyols (B) for the preparation of isocyanate-terminated prepolymers are polyols based on acrylonitrile or styrene and obtainable via RAFT polymerization.

The catalysts (D) used may be any catalysts customary in polyurethane production. Such catalysts are described, for example, in "Kunststoffhandbuch" [Plastics Handbook], volume 7, "Polyurethane" [Polyurethanes], Carl Hanser Verlag, 3rd edition 1993, chapter 3.4.1. Suitable examples thereof are organic metal compounds, preferably organic tin compounds, such as tin(II) salts of organic carboxylic acids, for example tin(II) acetate, tin(II) octoate, tin(II) ethylhexoate, and tin(II) laurate, and dialkyltin(IV) salts of organic carboxylic acids, for example dibutyltin diacetate, dibutyltin dilaurate, dibutyltin maleate, and dioctyltin diacetate, and also bismuth carboxylates such as bismuth(III) neodecanoate, bismuth 2-ethylhexanoate, and bismuth octanoate or mixtures.

Other possible catalysts are strongly basic amine catalysts. Examples of these are amidines such as 2,3-dimethyl-3,4,5,6-tetrahydropyrimidine, tertiary amines such as triethylamine, tributylamine, dimethylbenzylamine, N-methyl-, N-ethyl-, and N-cyclohexylmorpholine, N,N,N',N'-tetramethylethylenediamine, N,N,N',N'-tetramethylbutanediamine, N,N,N',N'-tetramethylhexanediamine, pentamethyldiethylenetriamine, tetramethyldiaminoethyl ether, bis(dimethylaminopropyl)urea, dimethylpiperazine, 1,2-dimethylimidazole, 1-azabicyclo[3.3.0]octane, and preferably 1,4-diazabicyclo[2.2.2]octane, and alkanolamine compounds such as triethanolamine, triisopropanolamine, N-methyl- and N-ethyldiethanolamine, and dimethylethanolamine. The catalysts may be used individually or as mixtures. Mixtures of metal catalysts and basic amine catalysts are optionally used as catalysts (D). The catalysts (D) can be used, for example, in a concentration of 0.001% to 5% by weight, in particular from 0.05% to 2% by weight, as catalyst or catalyst combination, based on the weight of components (A) to (E).

The auxiliaries and/or additives (E) used may be blowing agents, thixotropic additives, fillers, antioxidants, dyes, pigments, release agents, optical brighteners and stabilizers against heat, light and/or UV radiation, plasticizers or surface-active substances.

Examples of suitable release agents include: reaction products of fatty acid esters with polyisocyanates, salts from polysiloxanes bearing amino groups and fatty acids, salts from saturated or unsaturated (cyclo)aliphatic carboxylic acids having at least 8 carbon atoms and tertiary amines, and in particular internal release agents such as carboxylic esters and/or amides prepared by esterification or amidation of a mixture of montanic acid and at least one aliphatic carboxylic acid having at least 10 carbon atoms with at least difunctional alkanolamines, polyols and/or polyamines having molecular weights of 60 to 400 g/mol, as disclosed for example in EP 153 639, mixtures of organic amines, metal salts of stearic acid and organic mono- and/or dicarboxylic acids or the anhydrides thereof, as disclosed for example in DE-A-3 607 447, or mixtures of an imino compound, the metal salt of a carboxylic acid, and optionally a carboxylic acid, as disclosed for example in U.S. Pat. No. 4,764,537.

The blowing agents used may be any blowing agents known in the production of polyurethanes. These may include chemical and/or physical blowing agents. Such blowing agents are described, for example, in "Kunststoffhandbuch" [Plastics Handbook], volume 7, "Polyurethane" [Polyurethanes], Carl Hanser Verlag, 3rd edition 1993, chapter 3.4.5. Chemical blowing agents are understood as meaning compounds that form gaseous products by reaction with isocyanate. Examples of such blowing agents are water or carboxylic acids. Physical blowing agents are understood as meaning compounds that are dissolved or emulsified in the starting materials for polyurethane production and vaporize under the conditions of polyurethane formation. Examples of these are hydrocarbons, halogenated hydrocarbons, and other compounds such as fluorinated alkanes (hydrofluorocarbons, for example HFC245fa or HFC365mfc) such as perfluorohexane, hydrochlorofluorocarbons, hydrofluoroolefins (HFO1336mzz, HFO1233zd)), and ethers, esters, ketones and/or acetals.

The polyurethane hybrid polymers may be used for the production of hydrophobic compact coatings and hydrophobic rigid and flexible foams.

EXAMPLES

Raw Materials Used:

| | |
|---|---|
| KOH purity 98% | Sigma-Aldrich Chemie GmbH |
| CS$_2$ purity 99% | Sigma-Aldrich Chemie GmbH |
| 2-Bromopropionic acid purity >99% | Sigma Aldrich Chemie GmbH |
| Cr(III)Cl$_3$ purity 99% | Acros Organics |
| Toluene purity 99.8% | Sigma-Aldrich Chemie GmbH |
| PO (propylene oxide) purity 99.5% | Sigma-Aldrich Chemie GmbH |

Preparation of the RAFT Reagent:
Provision of Potassium Trithiocarbonate ($K_2CS_3$) and Reaction of $K_2CS_3$ with 2-Bromopropionic Acid to Form Trithiocarbonate Intermediate Compound I Potassium trithiocarbonate was prepared in accordance with the method disclosed in Macromolecules (2015), vol. 45, page 4958. A flask was charged with 1230 ml of deionized water and 215 g of KOH while stirring and then 273 g of carbon disulfide was added and stirring continued.

To this was added dropwise at room temperature 250 g of 2-bromopropionic acid and stirring was continued for 72 hours. The reaction solution was washed with $CH_2Cl_2$ and acidified with concentrated HCl, filtered, and dried. Volatiles were removed on a rotary evaporator. The yield of intermediate compound I is 45.32 g or 36% (theoretical: 207.8 g, 0.82 mol).

Propoxylation of Intermediate Compound I to Form RAFT Reagent II

An autoclave was charged under nitrogen with 18.75 g of intermediate compound I in 120 g of toluene and 0.16 of catalyst $CrCl_3$. 58 g of propylene oxide was then metered in under a nitrogen atmosphere and the mixture was heated to 80° C. and stirred for 3.5 hours. The temperature was then increased to 100° C. and stirring was continued at this temperature for 6 hours.

After cooling of the autoclave, the mixture was filtered and evaporated to dryness on a rotary evaporator. The yield was 86%.

The RAFT reagent II may have, by way of example, the following structure:

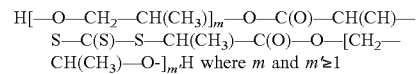

H[—O—CH$_2$—CH(CH$_3$)]$_m$—O—C(O)—CH(CH)—S—C(S)—S—CH(CH$_3$)—C(O)—O—[CH$_2$—CH(CH$_3$)—O-]$_m$'H where $m$ and $m' \geq 1$ Reaction of RAFT Reagent II with Styrene to Form α,ω-Polystyrene Diol III A three-necked flask was charged with 19.31 g of RAFT reagent II, 108.5 g of styrene, 521.8 g of dioxane, and 2.58 g of 2,2'-azobis(2,4-dimethylvaleronitrile). The atmosphere inside the apparatus was then replaced by nitrogen. The reaction was carried out at 60° C. under nitrogen for 22 hours. At the end of the reaction, the mixture was evaporated to dryness on a rotary evaporator and dried under reduced pressure. The yield was 87.97 g (69%). The number-average molecular weight was 2100 g/mol.

Preparation of Polyurethane-Polystyrene Hybrid Polymers and Polyurethane Polymers Via NCO Prepolymers
Starting Compounds Used:

| | |
|---|---|
| Polystyrene diol III: | number-average molecular weight M$_w$: 2100 g/mol, glass transition temperature T$_g$: 40° C., decomposition temperature T$_d$: 190° C. |
| Catalyst | Dabco 33LV from Air Products |
| Polyisocyanate 1 | 4,4'-diphenylmethane diisocyanate having an isocyanate content of 33.6% by weight (Desmodur ® 44M from Covestro Deutschland AG) |
| Polyisocyanate 2 | 4,4'-diphenylmethane diisocyanate containing oligomeric uretonimines, having an isocyanate content of 29.5% by weight (Desmodur ® CD-S from Covestro Deutschland AG) |
| Polyether polyol 1 | glycerol-started polyether polyol obtained from propylene oxide, having an OH value of 42 mg KOH/g |
| Polyether polyol 2 | linear, propylene glycol-started propylene oxide polyether polyol, having an OH value of 56 mg KOH/g |
| Polyether polyol 3 | glycerol-started polyether polyol obtained from propylene oxide and ethylene oxide, having an OH value of 35 mg KOH/g |
| Tripropylene glycol | |

Polystyrene diol III was ground in a mortar and added at 80° C. to the polyisocyanate component, causing it to dissolve and react to form the NCO prepolymer.

The second NCO prepolymer was prepared in the same way using the corresponding liquid polyol mixture.

The materials and amounts used are given in table 1.

TABLE 1

|  | Example 1 [wt.-%] | Example 2 Comparison [wt.-%] |
|---|---|---|
| Polystyrene diol III | 35.45 |  |
| Polyether polyol 1 |  | 3.0 |
| Polyether polyol 2 |  | 20.0 |
| Tripropylene glycol |  | 6.0 |
| Diphenylmethane diisocyanate | 58.3 | 66.0 |
| Polyisocyanate 2 | 6.25 | 5.0 |
| Sum | 100.0 | 100.0 |
| Isocyanate content of the prepolymer in [wt.-%] | 20.0 | 19.8 |
| Viscosity at 25° C. in [mPas] | 260 | 650 |

The two NCO prepolymers were reacted to form the polyurethane under typical conditions in polyurethane chemistry (room temperature, vigorous stirring).

The two NCO prepolymers were reacted to form the polyurethane or polyurethane-polystyrene hybrid polymer in the amounts shown in table 2.

TABLE 2

|  |  | Example 1' [parts by weight] | Example 2' Comparison [parts by weight] |
|---|---|---|---|
| Polyether polyol 3 |  | 100 | 100 |
| Catalyst |  | 0.1 | 0.1 |
| NCO prepolymer from example 2 |  |  | 14.5 |
| NCO prepolymer from example 1 |  | 14.5 |  |
| Content of polystyrene diol in end product | [wt.-%] | 4.5 | — |
| Compatibility reached after | [min] | 2 | 2 |
| Gel time | [min] | 24 | 23 |
| Properties of the end product: |  |  |  |
| after 24 hours |  | tack-free | tacky |
| Hardness after 15 days | Shore A | 42 | 37 |
| Hardness after 21 days | Shore A | 42 | 42 |
| DSC TG1 | [° C.] | −59.7 | −61.1 |
| Water absorption | [wt.-%] | 4.1 | 4.4 |
| Tensile test/elongation at break | [%] | 104 | 106 |
| Stress at 100% extension | [N/mm$^2$] | 1.12 | 1.09 |

There were no significant differences to begin with during processing. The reaction mixtures had become clear after stirring for two minutes, but the reaction mixture containing the polystyrene diol prepolymer solidified appreciably more swiftly.

Surprisingly, the end product showed an appreciably lower tendency (approx. 7%) to absorb water, even at a low content (4.5% by weight in the end product) of polystyrene diol, whereas the other physico-mechanical properties were equally good compared to the comparison product.

Production of Test Specimens:

The catalyst was first intimately mixed with the polyol using an IKA RW20 stirrer for 5 minutes. This mixture was then added at room temperature to the initial charge of the respective prepolymer in a paper cup and gently stirred with a wooden stick. The approx. 80 g mass was transferred to an unheated aluminum mold (9×9×2 cm$^3$) having a removable frame. The reaction mixture was allowed to cure under these conditions.

Test Methods:

| | |
|---|---|
| NCO content in [wt.-%] in accordance with | EN ISO 11909: 2007 |
| Viscosity in [mPas] in accordance with | DIN 53019-1 (2008) at 25° C. |
| Hardness in [Shore A] in accordance with | DIN 53506 |
| Water absorption in [wt.-%] | based on ISO 15512(2016): Round disks with a diameter of 5 cm and a thickness of approx. 1 cm were punched out of the cast plates. These were dried to constant weight for 4 days at 50° C. in a desiccator containing drying agent. The drying agent was then replaced with water. The samples were stored for three days at 50° C. under these conditions, after which the absorption of water was determined as the increase in weight. |
| Tensile/stress measurement in [N/mm$^2$] in accordance with | DIN 53571 (1986) |
| DSC measurement in accordance with | EN ISO 11357-1 (2009) |
| Gel time in [min] | is the time interval from the start of the mixing process until reaching the gel point. The gel point was determined using the Gel Timer from Gelnorm. |
| Compatibility in [min] | is the time taken for the stirred reaction components to be transformed from a turbid emulsion to a clear homogeneous mixture. |

It was surprisingly not possible to prepare polyurethane hybrid polymers by the so-called one-shot method. Even at a processing temperature of 50° C., the polystyrene diol seemingly does not dissolve in a reaction mixture consisting of polyether polyol, catalyst, and diphenylmethane diisocyanate with sufficient rapidity for it to be able to take part in the reaction. However, it was surprisingly found that preparation can be carried out without solvent if preparation is carried out via the prepolymer route.

The invention claimed is:

1. A method for preparing polyurethane hybrid polymers, comprising reacting polyisocyanates (A) with compounds (B) bearing isocyanate-reactive groups and optionally with chain extenders and/or crosslinkers (C) and optionally in the presence of a catalyst (D) and optionally auxiliaries and/or additives (E) in a molar ratio of NCO groups to OH and/or NH groups of 0.8:1 to 3.5:1, wherein i) the polyisocyanate (A) is an NCO prepolymer having an NCO content of 10% to 40% by weight,
which is prepared from at least one polyisocyanate (A') comprising at least one of aliphatic or aromatic polyisocyanates and at least one polyol component (B') comprising at least one of a polystyrene polyol having a number-average molecular weight of >1000 g/mol or a polyacrylonitrile polyol having a number-average molecular weight of >2000 g/mol and having the formula below and prepared as shown below:

2nRCH=CH$_2$+H—[O—R'—]$_m$O—C(O)—R"—S—C(S)—S—R"—C(O)—O[—R'—O]$_{m'}$—H→H—[O—R'—]$_m$O—C(O)—R"—[CH$_2$—CH(R)—]$_n$S—C(S)—S—[—CH$_2$—CH(R)—]$_{n'}$—R"—C(O)—O [—R'—O]$_{m'}$—H wherein R represents an aromatic radical C$_6$H$_5$ or a nitrile radical CN, n, n', m, and m' are each an integer ≥1, and R' and R" independently are alkylene radicals, and optionally at least one further polyol (B") comprising at least one of polyester polyols, polyether polyols, or polyetherester polyols, and ii) the compound (B) bearing isocyanate-reactive groups that is used is at least one compound comprising at least one of polyester polyols, polyether polyols, polyetherester polyols, or amino-terminated polyethers.

2. A polyurethane hybrid polymer prepared from polyisocyanates (A) and compounds (B) bearing isocyanate-reactive groups in a molar ratio of NCO groups to OH and/or NH groups of 0.8:1 to 3.5:1 comprising a reaction product of:
 a) at least one NCO prepolymer as polyisocyanate (A),
 b) at least one compound (B) bearing isocyanate-reactive groups comprising at least one of polyester polyols, polyether polyols, polyetherester polyols, or amino-terminated polyethers, and
 c) optionally chain extenders and/or crosslinkers (C)
 in the presence of
 d) optionally catalysts (D)
 e) optionally auxiliaries and/or additives (E),
 wherein the NCO prepolymer has an NCO content of 10% to 40% by weight and is prepared from at least one polyisocyanate (A') comprising at least one of aliphatic or aromatic polyisocyanates and at least one polyol component (B') comprising at least one of a polystyrene polyol having a number-average molecular weight of >1000 g/mol or a polyacrylonitrile polyol having a number-average molecular weight of >2000 g/mol and having the formula below and prepared as shown below:

$2n\text{RCH}=\text{CH}_2 + \text{H}-[\text{O}-\text{R'}-]_m\text{O}-\text{C(O)}-\text{R''}-\text{S}-\text{C}(\text{S})-\text{S}-\text{R''}-\text{C(O)}-\text{O}[-\text{R'}-\text{O}]_{m'}-\text{H} \rightarrow \text{H}-[\text{O}-\text{R'}-]_m\text{O}-\text{C(O)}-\text{R''}-[\text{CH}_2-\text{CH(R)}-]_n\text{S}-\text{C(S)}-\text{S}-[-\text{CH}_2-\text{CH(R)}-]_{n'}-\text{R''}-\text{C(O)}-\text{O}[-\text{R'}-\text{O}]_{m'}-\text{H}$ wherein R represents an aromatic radical $C_6H_5$ or a nitrile radical CN, n, n', m, and m' are each an integer $\geq 1$, and R' and R'' independently are alkyene radicals, and optionally a further polyol (B'') comprising at least one of polyester polyols, polyether polyols, or polyetherester polyols.

* * * * *